United States Patent [19]

Kanaya et al.

[11] Patent Number: 4,810,842
[45] Date of Patent: Mar. 7, 1989

[54] FRAME ASSEMBLY FOR MOUNTING WIRING DEVICES TO PANEL

[75] Inventors: Masayuki Kanaya; Toshiyuki Masuda, both of Matsuzaka; Osamu Yamada, Hirakata, all of Japan

[73] Assignee: Matsushita Electric Works, Ltd., Osaka, Japan

[21] Appl. No.: 92,526

[22] Filed: Sep. 3, 1987

[30] Foreign Application Priority Data

Sep. 20, 1986 [JP] Japan ................................ 61-222858

[51] Int. Cl.⁴ .............................................. H01H 9/00
[52] U.S. Cl. ..................................... 200/295; 200/296
[58] Field of Search ................. 200/296, 295; 174/58; 248/27.3

[56] References Cited

U.S. PATENT DOCUMENTS

| | | | |
|---|---|---|---|
| 3,562,468 | 2/1971 | Stafani | 200/295 |
| 3,674,961 | 7/1972 | Wright, Jr. | 200/295 |
| 4,340,795 | 7/1982 | Arthur | 200/296 |
| 4,434,339 | 2/1984 | Ohashi | 200/296 |
| 4,731,925 | 3/1988 | Tanishi et al. | 200/296 |

Primary Examiner—Renee S. Luebke
Attorney, Agent, or Firm—Burns, Doane, Swecker & Mathis

[57] ABSTRACT

A frame assembly for mounting an electric wiring device to a building panel comprises an exposing frame having a front plate to be disposed on a front face of the panel, and rearwardly extending side plates projecting through an aperture in the panel. The side plates carry projections arranged to underlie an edge of the aperture to retain the exposing frame to the panel. A supporting frame is provided for holding at least one of a plurality of modularized wiring devices. The supporting frame is disposed to the rear of the panel when the supporting frame is coupled to the exposing frame. The supporting frame includes tongues arranged to be positioned to the inside of the projections of the exposing frame to elastically support the projections from being uncoupled from the panel. The modular-dimensioned wiring devices are thereby allowed to be mounted to the panel easily without screws or the like.

1 Claim, 3 Drawing Sheets

FRAME ASSEMBLY FOR MOUNTING WIRING DEVICES TO PANEL

BACKGROUND ART OF THE INVENTION

This invention relates to a frame assembly for mounting wiring devices to a panel forming an interior wall surface or the like of buildings.

The frame assemblies of the kind referred to are effectively utilized for securing such wiring devices as ON/- OFF switches, power outlets, earthing terminals, antenna terminals, dimmers and the like to the interior wall surface of a panel of constructional materials of buildings.

DISCLOSURE OF PRIOR ART

Various types of measures for mounting such wiring devices have been suggested, an exemplary one of which would be a mounting frame disclosed in U.S. Pat. No. 4,434,339 of S. Ohashi. This mounting frame is provided for detachably holding such wiring devices as a switch, with peripheral edges at an aperture of a panel of the wall surface held between the frame and the switch to thereby secure the switch to the wall surface panel. In this case of the Ohashi patent, two side plates of the mounting frame are provided with holes for receiving engaging projections made on the switch, end edges of the side plates are extended to form elastic arms which are provided respectively with a wavy portion to engage frictionally the peripheral edges of the panel's aperture, and thereby enhance the locking force against the panel.

With this structure of the Ohashi patent, however, the switch is required to be provided in particular with the engaging projections for making direct coupling to the mounting frame, so that there will arise such a problem that the mounting frame is not utilizable for mounting any ready-made wiring devices which are not provided with the projections. Further, it is a recent tendency to have a plurality of the wiring devices of different types or of the same type formed in modular fashion and mounted in groups to the panel. In the case of the Ohashi patent in which the engaging projections are to be directly provided on the switch, however, it becomes necessary to configure the mounting frame in conformance with each one of the wiring devices so that a larger mounting space has to be provided and mounting and connecting works become complicated.

FIELD OF ART

A primary object of the present invention is, therefore, to provide a frame assembly for mounting at least one wiring device to one panel, which allows any ready-made wiring devices to be mounted to the panel and also modular-dimensioned wiring devices of the same or different types to be mounted concurrently with the minimum required space for their mounting and still in a simple manner.

According to the present invention, this object can be realized by providing a frame assembly for mounting a wiring device to a panel, which comprises an exposing frame to be disposed along a mounting aperture made in the panel for exposing the device, and a supporting frame provided for directly holding the device. The exposing frame comprises a front plate to be disposed on the front face of the panel and side plates extended rearward from the front plate, the side plates having means for securing the exposing frame to rear side edges of the aperture in the panel and means for coupling the exposing frame to the supporting frame. The supporting frame is provided for holding at least one modular-dimensioned wiring device engaged to the supporting frame and for being disposed on the rear side face of the panel. The supporting frame includes means engageable with the coupling means of the exposing frame to effect a connection to the latter.

Other objects and advantages of the present invention shall be made clear in the following disclosure detailed with reference to preferred embodiments shown in accompanying drawings.

While the present invention shall be explained in the followings with reference to the embodiments shown in the accompanying drawings, it should be appreciated that the intention is not to limit the invention only to these embodiments shown but rather to include all modifications, alterations and equivalent arrangement possible within the scope of appended claims.

DISCLOSURE OF PREFERRED EMBODIMENTS

Figure 1:
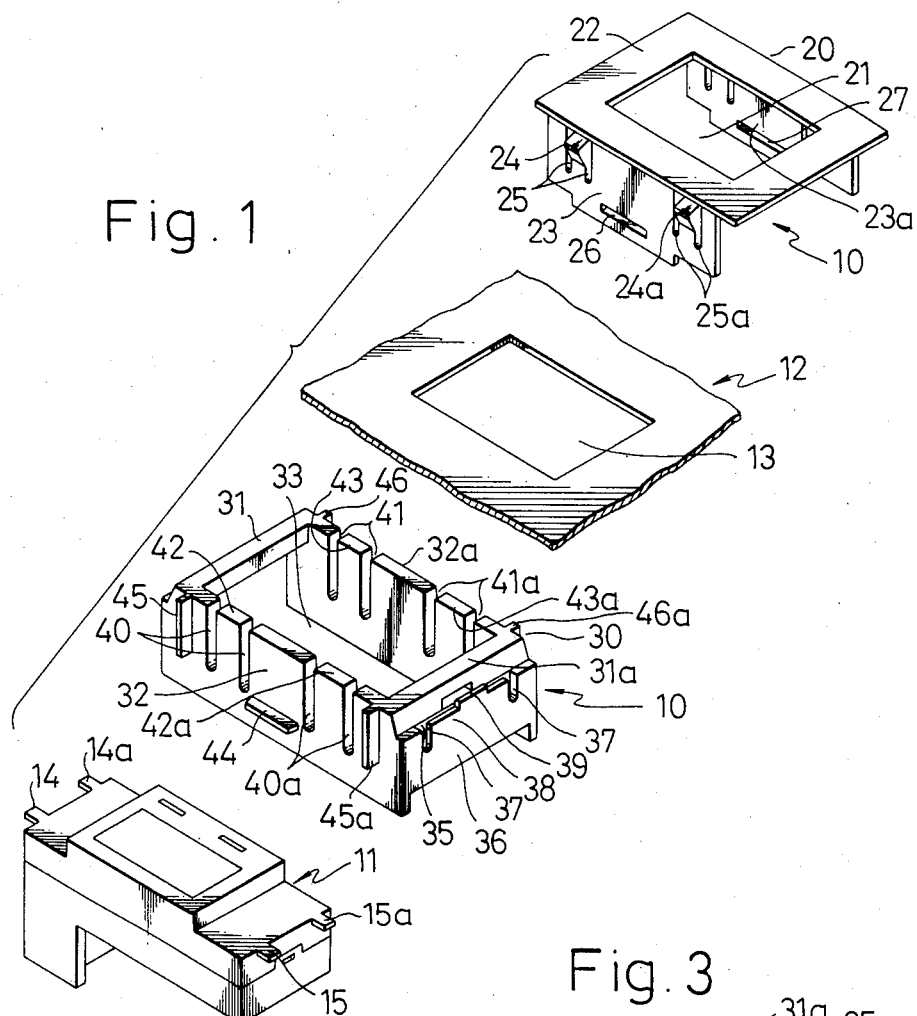
FIG. 1 is a perspective view as disassembled of the frame assembly in an embodiment of the present invention, for mounting a wiring device also shown herein to a panel fragmentarily shown here.

Referring to FIG. 1, there is shown a frame assembly 10 in an embodiment for mounting a wiring device 11 to a panel 12 of constructional material, with a part of the wiring device exposed out of an aperture 13 made in the panel 12. Here, the wiring device 11 may be a switch, outlet, earthing terminal, antenna terminal, dimmer or the like.

Figure 2:
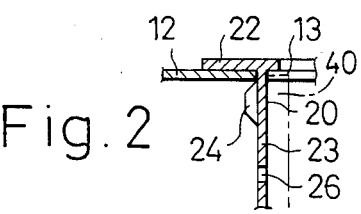
FIG. 2 is a fragmentary sectional view as magnified of the securing means of the exposing frame of the frame assembly of FIG. 1, shown as secured to the panel.

The frame assembly 10 comprises an exposing frame 20 and a supporting frame 30, which are preferably made of plastics. The exposing frame 20 is provided with a front plate 22 having an aperture 21 of a size slightly smaller than that of the aperture 13 of the panel 12 for exposing only a front face part of the wiring device 11, and with a pair of side plates 23 and 23a which are formed integral with the front plate 22 to extend as suspended therefrom, through the aperture 13, to the rear side of the panel 12, and these side plates 23 and 23a are respectively provided on a respective outer side with securing projections preferably in a pair 24 and 24a arranged to underlie and engage a rear edge of the aperture 13 of the panel 12 for securing the frame 20 to the panel, as will be seen when FIG. 2 is concurrently referred to. In the side plates 23 and 23a, a U-shaped slit 25 or 25a is made to enclose each of the projections 24 and 24a in extending direction of the plates 23 and 23a, so that the projections 24 and 24a will be disposed on frontward ends (upper ends in the drawing) of elastic pieces defined by the U-shaped slits so as to be elastically displaceable inward. The side plates 23 and 23a are further provided respectively with slits 26 and 27 extending parallel to an end edge of the plate for coupling purpose with the supporting frame 30.

Figure 3:
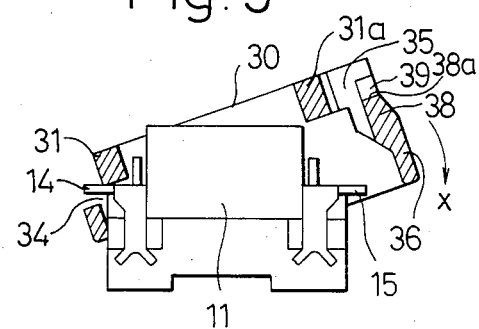
FIG. 3 is an explanatory view for a state in which the wiring device is coupled to the frame assembly shown in section of FIG. 1.

The supporting frame 30, on the other hand, is formed in a rectangular shape having two end bars 31 and 31a and side walls 32 and 32a. A supporting space 33 opened frontward and rearward is defined by the end bars 31, 31a and side walls 32, 32a to receive one of the wiring devices of any ready-made type but of a modular dimension, that is, the wiring devices of different functions which are formed substantially in an identical dimension so as to be mutually exchangeable. As will be seen when FIG. 3 is concurrently referred to, the supporting frame 30 is formed to have in one end bar 31 an integral or divided slit 34 for allowing engaging projections 14 and 14a of the wiring device 11 to be engaged therein, while the other end bar 31a of the supporting frame 30 is provided with a suspended wall 36 formed to define a gap 35 therebetween. A front edge of the wall includes a pair of slits 37 defining between them a relatively wide, elastic tongue piece 38. With these provisions, the wiring device 11 can be supported by the supporting frame 30 by initially engaging the projections 14 and 14a of the wiring device 11 into the slit 34 of the end bar 31 of the frame 30, as shown in FIG. 3, turning the frame 30, for example, in direction x about the thus engaged projections 14 and 14a as a fulcrum, and then engaging another pair of engaging projections 15 and 15a at the other end of the wiring device into the gap 35, with the elastic tongue piece 38 bowingly bent slightly outward by the projections 15 and 15a which are thereafter seated on front side edge 38a of the tongue piece 38. In this case, it is preferable that a positioning projection 39 is provided on the front end edge of the tongue piece 38, so as to be straddled by the projections 15 and 15a thus seated.

Further in the supporting frame 30, the side walls 32 and 32a are formed to have respectively two pairs of slits 40 and 40a or 41 and 41a opened forwardly to define two elastic tongue pieces 42 and 42a or 43 and 43a arranged so as to be disposed inside of the projections 24 and 24a of the exposing frame 20 and to elastically support these projections from the inside upon securing of the frame assembly to the panel 12 (FIG. 2). Further, a sideward projection 44 is provided parallel to a rearward end edge of each of the side walls 32 and 32a (only one on the side wall 32 is seen in FIG. 1) to be engageable in each of the slits 26 and 27 of the exposing frame 20.

The operation of mounting the wiring device 11 to the panel 12 by means of the frame assembly 10 in the foregoing embodiment of the present invention shall now be detailed. First, the suspended side plates 23 and 23a of the exposing frame 20 are inserted into the mounting aperture 13 in the panel 12 from its front side (top side in the drawings), whereupon the front plate 22 abuts the peripheral edges of the mounting aperture 13 of the panel on the front side thereof while the projections 24 and 24a of both side plates 23 and 23a pass through opposing peripheral edges of the aperture 13 and are thereby depressed elastically inward. Then the projections snap outwardly to lockingly engage the rear side face of the peripheral edges, so that the exposing frame 20 will be secured to the panel 12. In this case, the projections 24 and 24a should preferably be provided with both frontward and rearward tapered faces so that, when the tongue pieces carrying these projections are about to elastically return to their original position, the tapered faces will act as guide means for smoothly and reliably positioning the frame 20 in the panel's aperture 13 with its peripheral edges neatly held between the front plate 22 and the projections 24 and 24a.

The supporting frame 30 to which, on the other hand, the modular-dimensioned wiring device 11 has already been mounted to be thereby supported in the manner referred to with reference to FIG. 3, is then brought to the rear side of the panel 12 into a position between the both side plates 23 and 23a of the exposing frame 20 already secured to the panel 12. With the side walls 32 and 32a of the frame 30 disposed between the side plates 23 and 23a of the frame 20, the coupling projections 44 of the supporting frame 30 are engaged snappingly into the slits 26 and 27 of the exposing frame 20, and both frames are thereby coupled together. In this case, the side walls 32 and 32a of the supporting frame 30 are provided preferably with outward projections 45, 45a and 46, 46a at positions substantially facing respective longitudinal end edges of the side plates 23 and 23a of the exposing frame 20 so that, when the supporting frame 30 is being coupled to the frame 20, these projections 45, 45a and 46, 46a will function to guide the supporting frame 30 itself along the respective end edges of the side plates 23 and 23a of the frame 20.

By means of the arrangement and operation described above, any optional wiring device of the modular dimension can be mounted to the mounting aperture 13 in the panel 12 by means of the frame assembly 10 comprising the exposing and supporting frames 20 and 30.

Figure 4:
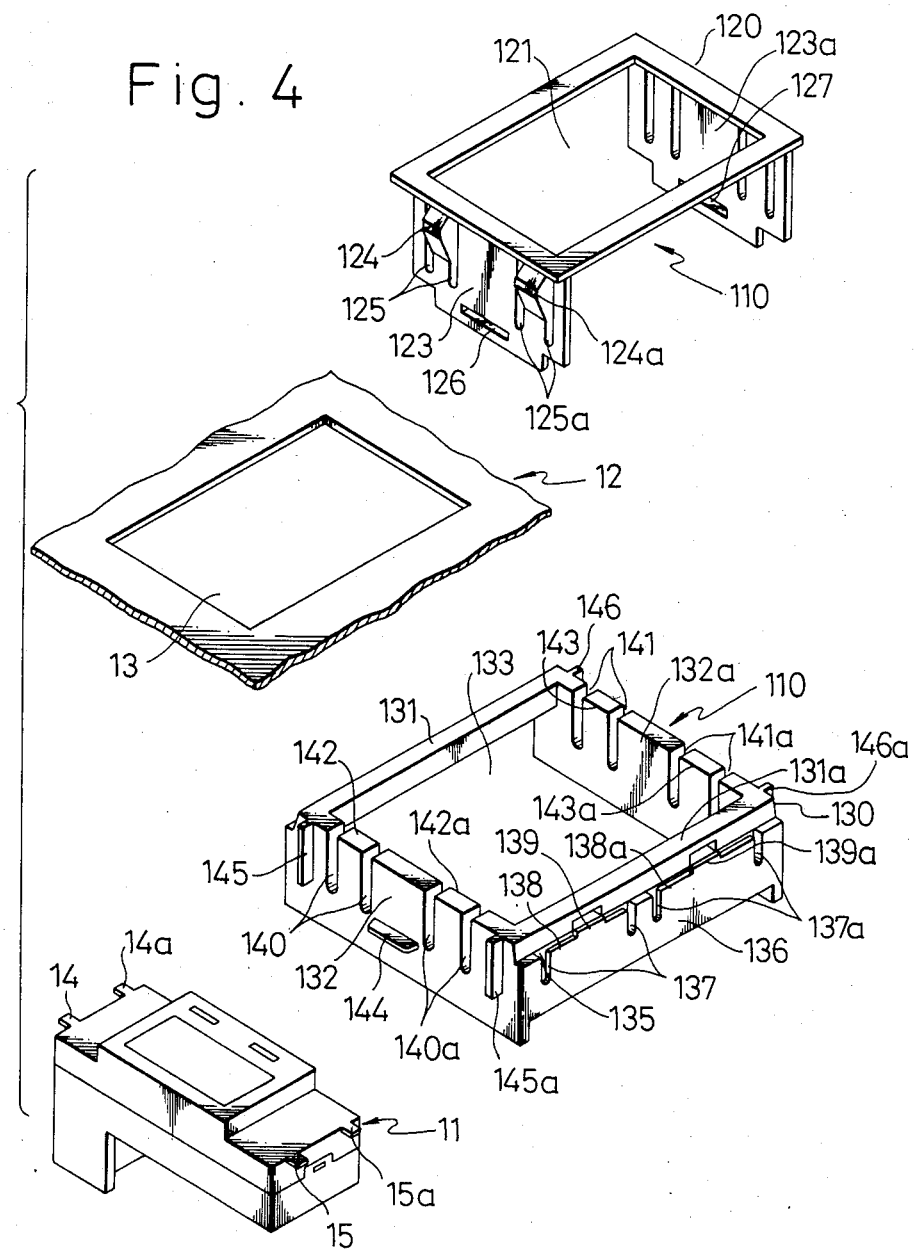
FIGS. 4 and 5 are perspective views similar to FIG. 1, respectively showing the frame assembly in each of other embodiments of the present invention.

Referring next to FIG. 4, there is shown a frame assembly 110 in another embodimnt of the present invention, which allows two of the wiring devices 11 of different types or identical type, but of the modular dimension in either event, to be mounted to the mounting aperture 13 of the panel 12. In the drawing, members corresponding to components of the embodiment of FIGS. 1 to 3 are denoted by the same reference numerals increased by 100. In the present instance, the mounting aperture 13 is enlarged for mounting thereto the two wiring devices 11, and the exposing and supporting frames 120 and 130 are similarly enlarged to have the aperture 121 adapted to expose the two wiring devices and the space 133 adapted also to support the two wiring devices, respectively. In this case, it should be appreciated that the supporting frame 130 has one end bar 131 provided with the integral or two pairs of slits 134 (not seen in FIG. 4) in which the respective engaging projections 14 and 14a of the both wiring devices 11 are engageable. In the suspended wall 136 at the other end bar 131a of the supporting frame 130, further, two relatively wide, elastic tongue pieces 138, 138a are provided as defined by two pairs of the slits 137, 137a and two of the positioning projections 139, 139a are provided in the center of the respective frontward edges (top side in the drawing) of these tongue pieces 138, 138a. With this arrangement, two of the wiring devices 11 can be mounted to the panel 12 by means of the frame assembly 110 by sequentially supporting the devices in the supporting frame 130 in the manner described with reference to FIG. 3, and coupling the frame 130 carrying the two devices to the exposing frame 120 also in the sequence already described. Other arrangements and functions of other members are substantially the same as those in the foregoing embodiment of FIGS. 1 to 3.

Figure 5:
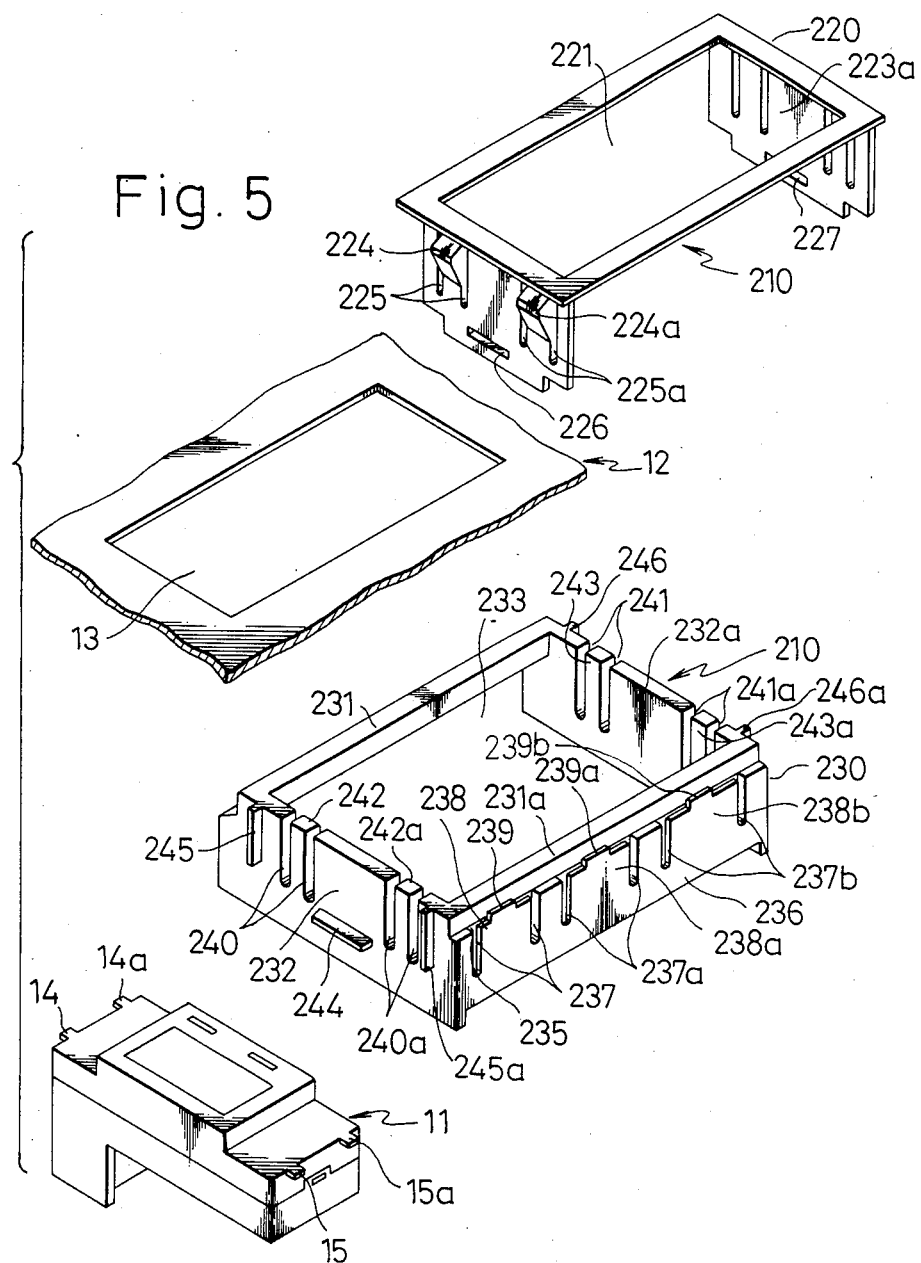

Referring now to FIG. 5, a frame assembly 210 in still another embodiment of the invention and capable of mounting three different or identical type wiring devices 11 of the modular dimension to the mounting aperture 13 in the panel 12 is shown here. In the drawing, members corresponding to the components of the embodiment shown in FIGS. 1 to 3 are denoted by the same reference numerals increased by 200. In the present instance, the mounting aperture 13 of the panel 12 is enlarged for mounting the three wiring devices 11, while the exposing and supporting frames 220 and 230 are likewise enlarged to have the aperture 221 and the mounting space 233 adapted to expose and support the three wiring devices 11, respectively. It should be appreciated that, in the present instance, too, the supporting frame 230 is made to have in the one end bar 231 the integral or divided slit 234 (not shown here) for engaging therein three pairs of engaging projections 14 and 14a of the three wiring devices 11, and that the suspended wall 236 at the other end bar 231a is made to have three of the relatively wide elastic tongue pieces 238, 238a and 238b defined by three pairs of the slits 237, 237a and 237b while three positioning projections 239, 239a and 239b are provided respectively in the center of the frontward edge of each tongue piece. With this arrangement, the three wiring devices can be mounted to the panel 12 through the frame assembly 210, by having these devices supported sequentially in the supporting space 233 of the frame 230 in the manner described with reference to FIGS. 1 to 3, and coupling such supporting frame 230 to the exposing frame 220 preliminarily fitted to the aperture 13 of the panel 12. Other arrangements and functions are substantially the same as those in the embodiment of FIGS. 1 to 3.

In the present invention, various design modifications are possible without altering the gist of the invention. Instead of one to three of the wiring devices as has been described, for example, the frame assembly can be formed for mounting for or more of the wiring devices. In the case of the frame assembly for more than two of the wiring devices, further, it is possible to have only one device supported and mounted to the panel while the rest of the aperture of the exposing frame is covered by a properly dimensioned cover plate or plates so that, when an additional one or ones of the wiring device is intended to be mounted, the cover plate or plates may be removed for the additional mounting.

What is claimed as our invention is:

1. A frame assembly for mounting modular-dimensioned wiring devices to a panel, comprising an exposing frame securable to a mounting aperture formed in the panel for exposing the wiring devices, and a supporting frame for directly holding the wiring device, said exposing frame including a front plate part arranged to be disposed on a front side of the panel and a side part extending rearwardly from said front plate part to project into the aperture, said side part having securing means arranged to project outwardly to underlie an edge of the aperture for connecting said exposing frame within the aperture, and means for coupling said exposing frame to said supporting frame with said supporting frame disposed to the rear of the panel, said supporting frame being configured for holding at least one modular-dimensioned wiring device engaged to said supporting frame, said supporting frame including means engageable with said coupling means of said exposing frame for connecting said supporting frame to said exposing frame, said supporting frame including elastic support means arranged to lie to the inside of said securing means for elastically supporting said securing means against disconnection from the panel, wherein said securing means comprising a plurality of elastically mounted outward projections, said elastic supporting means comprising elastically mounted tongues associated with respective ones of said projections.

* * * * *